US010101820B2

(12) United States Patent
Creamer et al.

(10) Patent No.: US 10,101,820 B2
(45) Date of Patent: Oct. 16, 2018

(54) AUTOMATED LEARNING AND GESTURE BASED INTEREST PROCESSING

(71) Applicant: International Business Machines Corporation, Armonk, NY (US)

(72) Inventors: Thomas E. Creamer, Boca Raton, FL (US); Erik H. Katzen, Argyle, TX (US); Sumit Patel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/216,060

(22) Filed: Jul. 21, 2016

(65) Prior Publication Data

US 2018/0024639 A1   Jan. 25, 2018

(51) Int. Cl.
  G06F 3/01   (2006.01)
  G06F 17/30  (2006.01)
  G06K 9/66   (2006.01)

(52) U.S. Cl.
  CPC .......... G06F 3/017 (2013.01); G06F 17/3053 (2013.01); G06F 17/30598 (2013.01); G06K 9/66 (2013.01)

(58) Field of Classification Search
  USPC ........................................................ 382/103
  See application file for complete search history.

(56) References Cited

U.S. PATENT DOCUMENTS

| 9,129,604 | B2 | 9/2015 | Vennelakanti et al. |
| 2013/0151339 | A1 | 6/2013 | Kim et al. |
| 2015/0006280 | A1 | 1/2015 | Ruiz et al. |
| 2016/0283564 | A1* | 9/2016 | Sharon .............. G06F 17/30554 |
| 2016/0328029 | A1* | 11/2016 | March .................. G06F 3/0346 |

OTHER PUBLICATIONS

Kapanipathi, Pavan et al.; "User Interests Identification on Twitter Using a Hierarchical Knowledge Base"; Hierarchical Interest Graph; pp. 15.
"PLOS One"; PLOS One Subject Areas; Printed Feb. 29, 2016; pp. 5; <http://www.plosone.org/taxonomy>.
Non Final Office Action dated Feb. 27, 2018 for U.S. Appl. No. 15/850,286, filed Dec. 21, 2017; pp. 15.

* cited by examiner

*Primary Examiner* — Amandeep Saini
(74) *Attorney, Agent, or Firm* — Douglas Lashmit; Hoffman Warnick LLC

(57) ABSTRACT

A system, method and program product for processing user interests. A system is provided that includes: a gesture management system that receives gesture data from a collection device for an inputted interest of a user; a pattern detection system that receives and analyzes behavior data associated with the inputted interest; an interest affinity scoring system that calculates an affinity score for the inputted interest based on the gesture data and an analysis of the behavior data; a dynamic classification system that assigns a dynamically generated tag to the inputted interest based on an inputted context associated with the inputted interest; and a user interest database that stores structured interest information for the user, including a unique record for the inputted interest that includes the affinity score and dynamically generated tag.

14 Claims, 2 Drawing Sheets

AUTOMATED LEARNING AND GESTURE BASED INTEREST PROCESSING

TECHNICAL FIELD

The subject matter of this invention relates to interest management, and more particularly to an automated learning and gesture based interest processing system and method.

BACKGROUND

There exist numerous technologies for evaluating user interactions to identify interests of a user. For example, based on a web browsing history of a user, processes exist to determine possible purchasing interests of the user. Thus, if a user spends time searching for hotels in a resort area, the system can readily deduce that the user has an interest in traveling to the resort area. More involved systems may for example track geospatial movements of a user, social networking connections, emotional states, etc., to understand what users are interested in.

SUMMARY

Aspects of the disclosure provide a platform for processing collected interest related information for a user. More particularly, user interests are processed into a structured set of data that assigns a score and a dynamically generated tag to each interest, based, e.g., on inputted gesture data, behavior data, and associated context data.

A first aspect discloses a system for processing user interests, comprising: a gesture management system that receives gesture data from a collection device for an inputted interest of a user; a pattern detection system that receives and analyzes behavior data associated with the inputted interest; an interest affinity scoring system that calculates an affinity score for the inputted interest based on the gesture data and an analysis of the behavior data; a dynamic classification system that assigns a dynamically generated tag to the inputted interest based on an inputted context associated with the inputted interest; and a user interest database that stores structured interest information for the user, including a unique record for the inputted interest that includes the affinity score and dynamically generated tag.

A second aspect discloses a computer program product stored on a computer readable storage medium, which when executed by a computing system, processes user interests, the program product comprising: program code that receives gesture data from a collection device for an inputted interest of a user; program code that receives and analyzes behavior data associated with the inputted interest; program code that calculates an affinity score for the inputted interest based on the gesture data and an analysis of the behavior data; program code that assigns a dynamically generated tag to the inputted interest based on an inputted context associated with the inputted interest; and program code that stores structured interest information for the user, including a unique record for the inputted interest that includes the affinity score and dynamically generated tag.

A third aspect discloses a computerized method for processing user interests, comprising: receiving gesture data from a collection device for an inputted interest of a user; receiving and analyzing behavior data associated with the inputted interest; calculating an affinity score for the inputted interest based on the gesture data and an analysis of the behavior data; assigning a dynamically generated tag to the inputted interest based on an inputted context associated with the inputted interest; and storing structured interest information for the user that includes a unique record for the inputted interest having the affinity score and dynamically generated tag.

BRIEF DESCRIPTION OF THE DRAWINGS

These and other features of this invention will be more readily understood from the following detailed description of the various aspects of the invention taken in conjunction with the accompanying drawings in which.

Figure 1:
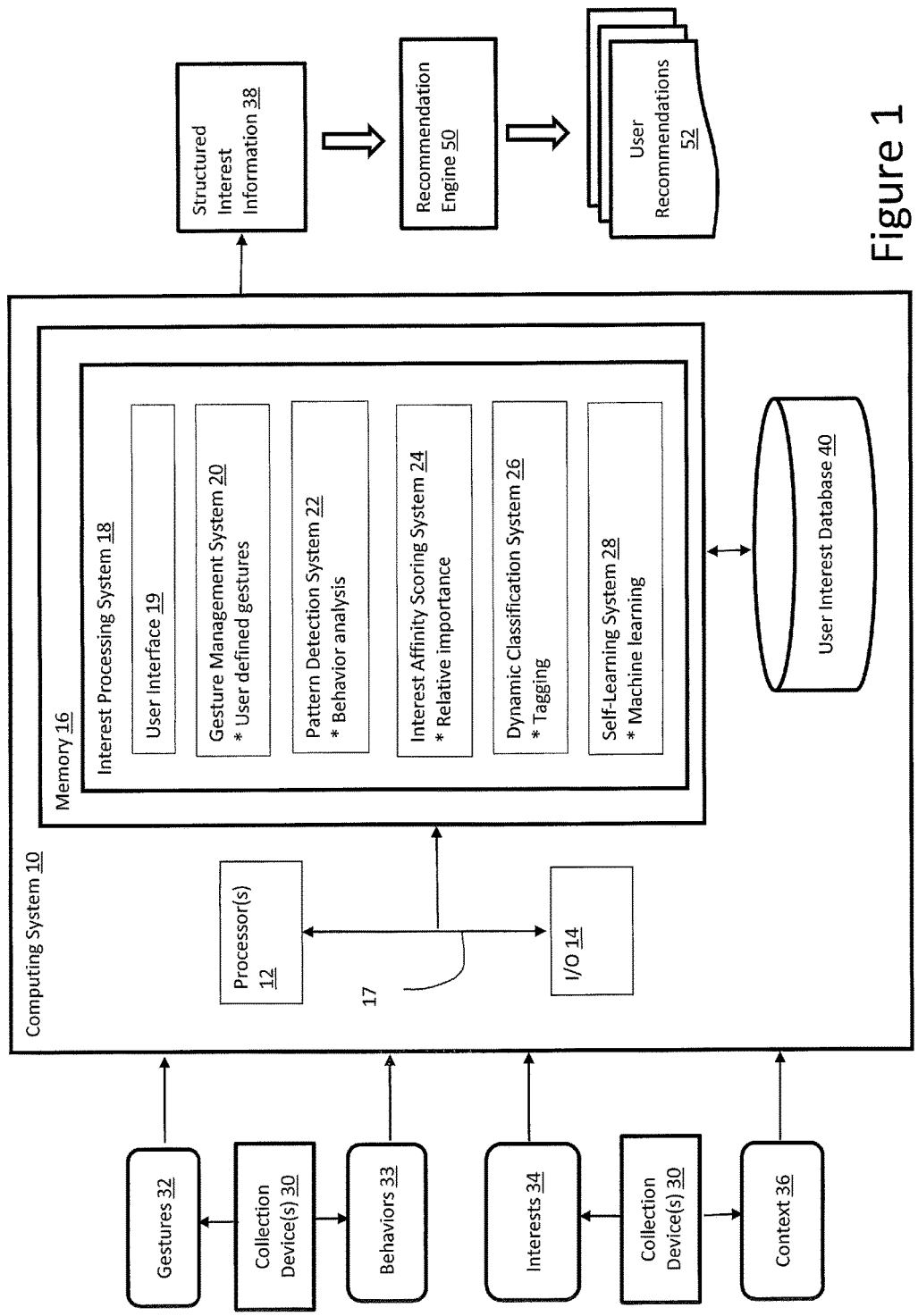
FIG. 1 shows a computing system having an interest processing system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the present invention recognize that challenges exist with the ability to effectively prioritize interests and categorize them in a meaningful way. For instance, users are often bombarded and distracted with content that is not relevant to the particular user. For example, a user may be highly engaged with a comical advertisement for a product. However, the user may only be interested in the comedy and not the product. In such a situation, current systems will more often than not assume that the user is interested in the product and provide advertisements and marketing material that relate to the product. This results in unwanted content directed at the user and an opportunity will be missed to provide the user with useful content, e.g., comedy based movies, videos, etc.

Referring now to the drawings, FIG. 1 depicts a computing system 10 having an interest processing system 18 that evaluates inputted interests 34 and associated context 36 to generate structured interest information 38 that includes dynamically categorized and prioritized interests of a user. One or more collection devices 30, such as a smart phone application using natural language (NL) inputs, smart sensors such as those found in smart glasses and clothing, a user controlled camera/microphone, etc., collect interests 34 and/or the associated context 36. For instance, if a user views and holds a product in a retail store, image data of the product may be captured from a smart sensor, analyzed and identified as an interest 34. Context 36 may for example include location data, date and time information, weather conditions, user engagement activity (e.g., is the user exercising, watching TV, etc.), user inputs (e.g., "this would be a great gift for Jenny"), etc. Alternatively, interests 34 and/or the associated context 36 may be obtained from third party systems designed to collect such information (web analytics, etc.). Regardless, once collected, a user interest database 40 stores and manages interest related information.

Once interest related information is received by interest processing system 18, interest processing system 18 dynamically categorizes and prioritizes structured interest information 38 for use by the user and/or makes structured interest information 38 available to other systems. Interest processing system 18 may forward the structured interest information 38 into a recommendation engine 50 that provides the user with user recommendations 52, e.g., in the form of lists, coupons, marketing material, time management suggestions, entertainment content, work-related assistance, etc.

Interest processing system 18 generally includes: (1) a user interface 19 for allowing a user to configure and interact with the system; (2) a gesture management system 20 that receives and processes gesture data from the user, including user-defined gestures 32 captured using one or more collection devices 30 that help quantify a relevance to an associated interest 34; (3) a pattern detection system 22 that analyzes captured user behaviors 33 and employs self-learning to correlate behaviors 33 to interests 34; (4) an interest affinity scoring system 24 that dynamically calculates and updates affinity scores for different interests 34 based on, e.g., information generated by gesture management system 20, pattern detection system 22, and any captured context 36; (5) a dynamic classification system 26 that categorizes and tags interests, e.g., based on inputted context 36, user behaviors 33, etc.; and (6) a self-learning system 28 that utilizes machine learning to evaluate and continuously improve the described processes as more information is collected in the user interest database 40.

In one embodiment, gesture management system 20 utilizes user interface 19 to allow users to define certain physical actions (i.e., user-defined gestures) and associate a first indicator of relevance for the user. For example, user defined gestures may include blinking rapidly three times or picking up an item and rotating it 360 degrees to indicate high interest. Snapping of the fingers may be used to associate an interest with an immediate need, shaking of the user's head left and right may indicate a very low interest, etc. Collection devices 30 such as smart glasses or smart clothing may be used to capture and/or identify a user defined gesture. Once captured, gesture management system 20 links the gesture to an associated interest and stores the result in user interest database 40.

Pattern detection system 22 operates similar to the gesture management system 20, except rather than relying on user defined gestures, pattern detection system 22 analyzes user behaviors not predefined by the user, e.g., touching of the chin, smiling, increased heartrate, etc. Over time, self-learning system 28 categorizes and correlates different behavior patterns with a second indicator of relevance, e.g., behavior 1=highly important, behavior 2=indifference, behavior 3=concern. When a recognized behavior is captured with an associated interest, pattern detection system 22 stores the information for use in helping to quantify the interest for the user. This allows underlying correlations, such as touching of the chin anytime something is of interest, to be known and leveraged by interest processing system 18.

Interest affinity scoring system 24 utilizes the information obtained from the gesture management system 20 (i.e., the first indicator of relevance) and pattern recognition system 22 (i.e., the second indicator of relevance), as well as previously stored information in the user interest database 40, to quantify and assign a numerical value to each inputted interest 34. For example, interest affinity scoring system 24 may assign an interest 34 a score of between −1 and 1 with negative values indicating little to no interest and positive values indicating high interest. Furthermore, interest affinity scoring system 24 continuously or periodically re-scores existing interests stored in the user interest database 40 based on any number of factors, e.g., an age of the interest (did the user lose interest due to an amount of time that has passed since the interest was last inputted?), purchase history (did the user purchase an item of interest and can thus be removed from the list?), change of circumstances (did the user move into a larger home making an interest more important?), interest frequency (is the same interest being detected over and over for the user?), etc. For example, if digital camera A seems to consume a greater percentage of a user's interest over time than digital camera B due to more search terms, interactions, mentions, etc., then interest affinity scoring system 24 can increase the affinity score for camera A relative to camera B. However, if the user were to purchase camera A, then the affinity score for both may be reduced since the user presumably is no longer interested in shopping for the item.

Dynamic classification system 26 assigns each interest 34 into a dynamically generated category. The category is identified with a "classification tag" that may be automatically generated by the system 26, selected from a preexisting set of classification tags, or manually entered by the user via the user interface 19. Dynamic classification system 26 provides automated generation by evaluating inputted context 36 associated with the interest 34. For example, a user may have interests 34 in protein supplements and a digital camera. Associated context 36, such as speech or text, captured along with the interest 34 by a collection device 30 may include the fact that protein supplements are mentioned in a grocery store shopping list while digital cameras are frequently mentioned in text messages or conversations along with the phrases "gift," "Jenny's birthday," "items Jenny likes," etc.

By analyzing the context 36 and gestures 32, dynamic classification system 26 is able to automatically classify (or suggest a classification for) the interest 34 with a tag. The user, e.g., via user interface 19, is then able to confirm or edit tags, such that the interest processing system 18 more effectively understands interests for the user. Illustrative tags and associated interests may include:

"Things to buy immediately"=Protein Supplements
"Gift for Jenny"=Digital Camera
"Further Study"=Peppermint Tea
"Non-favored Interests, Discard"=Chat with Cable Sales Representative.

Note that the dynamic classification system 26 may utilize unique, personalized, and/or detailed tags ("Things to Buy", "Gift for Jenny", "Further Study") that are dynamically created and changed as the dynamic classification system 26 learns how the user recalls the interests. For example, something initially classified by dynamic classification system 26 as "Things to buy immediately" may be retagged as "Further Study" if dynamic classification system 26 notices that the item is becoming less pervasive in purchasing discussions or is not mentioned altogether. In addition to generating new tags, dynamic classification system 26 may prioritize and re-use existing tags over time to help organize a user's interests.

The use of tags that accurately categorize interests allows for much more robust results. For example, if a user is in line at a coffee shop looking and reacting to an advertisement featuring a comical story about how a new coffee, "blend ABC," is just right in terms of flavor, there are two potential interests that may be captured. The more obvious interest is the new blend of coffee; and dynamic classification system 26 can deduce, based on existing context in the database 40, that the user is becoming more and more interested in coffee, and generates a new tag for the interest:

"Coffee blends to try"=ABC coffee

However, what if the user was not interested in the coffee blend but was instead fixated on the comical advertisement, as the user happens to be a marketing professional. In this case, dynamic classification system 26 recognizes the user's professional context involving advertising and, e.g., selects an existing tag associated with the context:

"Clever advertisements"=ABC coffee.

In one illustrative embodiment, interest processing system 18 presents the user with both tags and allow the user to choose which one the user wants. Alternatively, both tags may be maintained for the interest "ABC coffee" until such time that the dynamic classification system 26 determines which tag is more accurate (e.g., based on future interest and context inputs). Without the dynamic tagging feature to organize potential interests, the use of interest information could be easily misused, e.g., by recommendation engine 50, to provide inaccurate user recommendations 52, etc. For example, the user might start receiving email coupons for coffee that does not at all interest the user.

Any of the disclosed processes mentioned herein may utilize self-learning system 28 to help analyze and re-analyze interest information as more and more information is stored in user interest database 40. For example, self-learning system 28 may recognize that certain behavior patterns of the user are correlated with high interest when captured with work related interests, but are not correlated with personal interests. Accordingly, those behavior patterns would only be considered as relevant for interests associated with the workplace. Self-learning system 28 may utilize any machine learning approach, including, unsupervised learning, supervised learning, reinforced learning, classification, regression, clustering, neural networking, etc.

In one illustrative embodiment, user interest database 40 provides a data taxonomy that can capture and store each interest 34 as an "interest record." An illustrative example of an interest record is as follows:

---

<Interest 1> = Digital Camera A
    <Context 1> = Date 1: Location 1
        <Context 1.NL> = "Jenny would love a Digital Camera for her birthday"
    <Context 2> = Date 2: Location 2
        <Context 1.Search.String> = "Digital Camera for underwater"
    <Context 3> = Calendar: Jenny Birthday = August 1
    <Classification Tag> = "Birthday gift options for Jenny"
    <Gesture 1> = Date 3: Location 3: {Three Blinks}
        <Value> = 5
    <Gesture 2> = Date 4: Location 4: {Snap}
        <Value> = 3
    <Behavior 1> = Date 4: Location 4: {Smile}
        <Value> = 5
    <Affinity Score> = 0.75

---

In the above example, the interest processing system 18 identifies the interest as "digital camera A" and includes a classification tag of "Birthday gift options for Jenny" and an affinity score of 0.75. The context, gesture data and behavior entries support the determination of the classification tag and affinity score. As noted, context entries primarily determine the classification tag. In this example, an unsupervised learning algorithm that analyzes NL inputs for a most likely meaning determines the classification tag. An algorithm that considers context, gesture data and behavior data may calculate the affinity score. For example:

Affinity Score=$f$(average of gesture values, sum of behavior values, #context entries).

In this example, the affinity score is a function f based on three indicators of relevance, including the average of the gesture values, and the sum of the behavior values and the number of context entries. Obviously, the particular algorithm to calculate gesture values and behavior values, as well as the affinity score may be implemented in any manner and consider any factors and weights. For example, the interest affinity scoring system 24 may weight more recent gesture values heavier than older gesture values. Also, it is noted that over time, interest processing system 18 can collect additional context, gestures and behavior inputs that might cause the current tag or affinity score to change.

Figure 2:
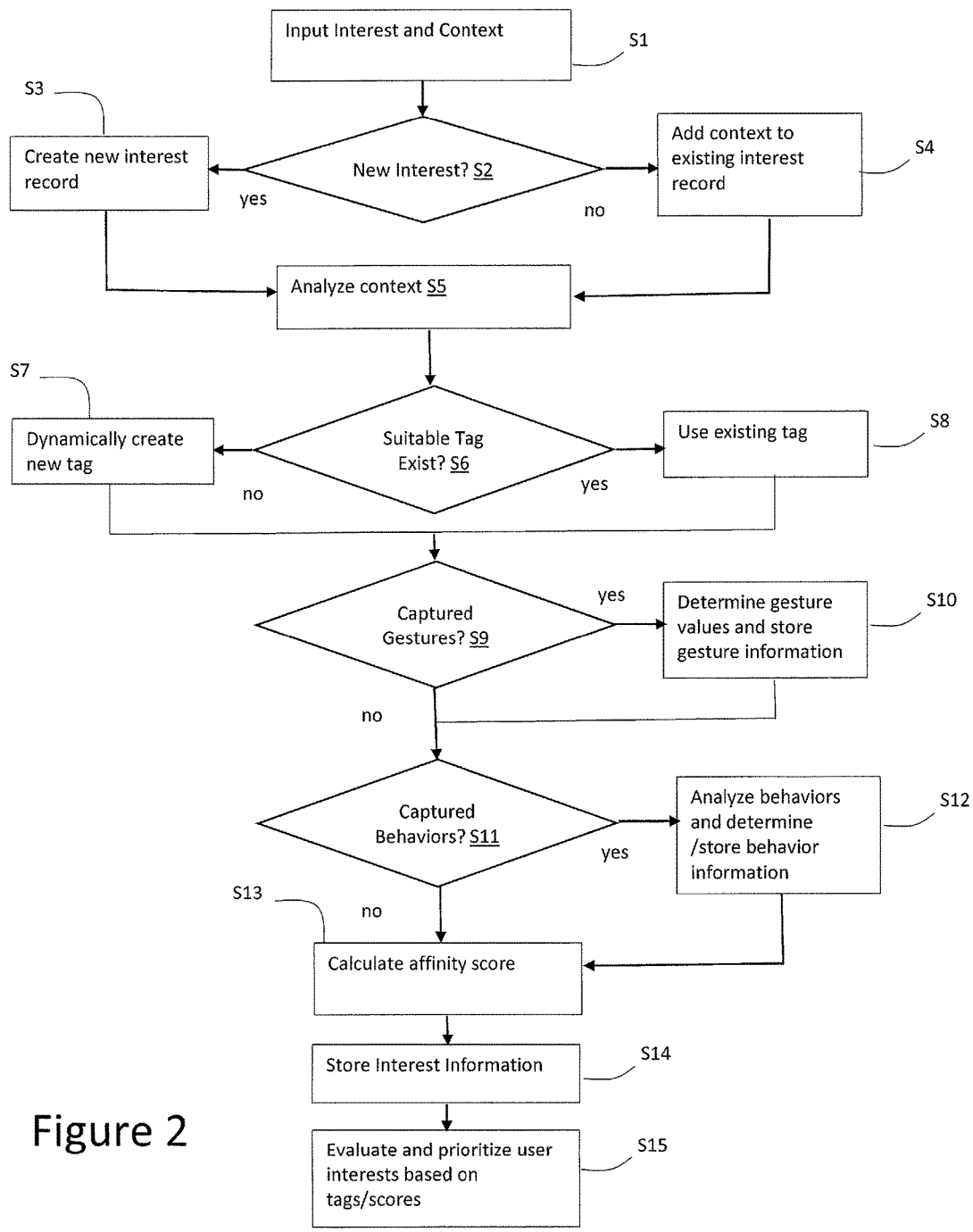
FIG. 2 shows a flow diagram of a method of implementing the interest processing system according to embodiments.

FIG. 2 depicts a flow diagram of a method of implementing interest processing system 18 of FIG. 1. At S1, interest processing system 18 inputs an interest 34 and associated context 36. An interest 34 may comprise any topic that has been identified as relevant to the user, and context 36 may comprise any metadata or ancillary information identified as being relevant to the interest 34, e.g., time, location, NL input, calendar entries, etc. (Note that context 36 generally does not include gesture or behavior information.) At S2, user interest database 40 determines whether the inputted interest 34 in a new interest, and if so, a new interest record in the user interest database 40 is created at S3. If not, interest processing system 18 adds the context 36 to an existing interest record in the user interest database 40. Regardless, at S5, dynamic classification system 26 analyzes the context 36 to identify a suitable classification tag for the interest 34 and at S6 determines whether a suitable classification tag exists. A suitable tag may include a pre-existing tag that was created for another record, a tag already assigned to the interest 34, or one of a plurality of tags predefined within the system 18. If a suitable tag does not exist, then either dynamic classification system 26 creates a new tag or the user creates one manually at S7; otherwise dynamic classification system 26 uses an existing tag at S8.

Next, at S9, gesture management system 20 determines whether there were any gestures captured with the inputted interest 34. If yes, gesture management system 20 determines a value (i.e., first indicator of relevance) for the gesture (e.g., from a look-up table) and stores the gesture information in the interest record at S10. At S11, pattern detection system 22 determines whether there were any behaviors captured for the inputted interest 34. If yes, pattern detection system 22 analyzes the behaviors against different sets of existing behavior patterns and interests to determine an associated value (i.e., second indicator of relevance) of the behavior, and stores the behavior information at S12.

Next, at S13, interest affinity scoring system 24 calculates an affinity score for the interest 34 and stores all of the interest information in the interest record at S14. At S15, interest processing system evaluates and prioritizes user interests based on the classification tags and affinity scores for all inputted interests. For example, there may be a set of 100 interest records having the classification tag "Things to research further," each having an associated affinity score. A ranked list of the top 15 interests for that classification may be generated by interest processing system 18 and provided to the user, or be provided to a recommendation engine 50 or other such system for further use.

By evaluating gesture, behavior and context inputs in this manner, the most relevant and active interests of a user can be readily identified by, e.g., a recommendation engine 50. This ensures that engagement with the interest processing system 18 is maintained by only prompting recommendations or suggestions which are likely to resonate. Users are able to automatically accurately recall the most meaningful interests and interactions in an organized fashion. Moreover, using a categorization schema that periodically reevaluates interests, users do not have to worry about outdated items in their interest collection. Organizing the interests and interactions in this manner allows for easier tracking of the interest lifecycle.

Further, by searching for all interactions and interests related to digital cameras, the user is able to see the full picture of their interests at a macro level, allowing for further analysis in case they are evaluating a purchasing decision. Also, by allowing users to manually tag interests, the system 18 is capable of learning and adapting to the individual, so that all the benefits mentioned herein become exponentially better over time.

It is understood that interest processing system 18 may be implemented as a computer program product stored on a computer readable storage medium.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the interest processing system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for processing user interests, comprising:
    an interface for receiving an inputted interest and an inputted context from a user, wherein the inputted context includes a natural language input;
    a gesture management system that receives gesture data from a collection device with the inputted interest to identify a gesture from a set of gestures predefined by the user;
    a pattern detection system that receives behavior data associated with the inputted interest and determines whether the behavior data includes a recognized behavior pattern based on previously collected behavior data of the user, in which the recognized behavior pattern was not predefined by the user;
    an interest affinity scoring system that calculates an affinity score for the inputted interest based on an identified gesture and a recognized behavior pattern;
    a dynamic classification system that assigns a dynamically generated tag to the inputted interest based on the natural language input; and
    a user interest database that stores structured interest information for the user, including a unique record for the inputted interest that includes the affinity score and dynamically generated tag.

2. The system of claim 1, wherein each gesture in the set of set of gestures defined by the user includes a first indicator of relevance to the user.

3. The system of claim 2, wherein previously collected behavior data is stored in a user interest database.

4. The system of claim 3, wherein recognized behavior patterns are correlated by a learning system with a second indicator of relevance to the user.

5. The system of claim 4, wherein the interest affinity scoring system utilizes the first indicator of relevance and the second indicator of relevance to calculate the affinity score.

6. The system of claim 1, wherein the natural language input is used to form the dynamically generated tag.

7. The system of claim 1, wherein the dynamically generated tag and affinity score are periodically reevaluated and updated in response to a received additional inputted context associated with the inputted interest.

8. A computer program product stored on a computer readable storage medium, which when executed by a computing system, processes user interests, the program product comprising:
    program code for receiving an inputted interest from a user and an inputted context, wherein the inputted context includes at least one of a natural language input, a time parameter and a location parameter;
    program code that receives gesture data from a collection device with the inputted interest to identify a gesture from a set of gestures predefined by the user;
    program code that receives behavior data associated with the inputted interest and determines whether the behavior data includes a recognized behavior pattern based on previously collected behavior data of the user, in which the recognized behavior pattern was not predefined by the user;
    program code that calculates an affinity score for the inputted interest based on an identified gesture and a recognized behavior pattern;
    program code that assigns a dynamically generated tag to the inputted interest based on the inputted context associated with the inputted interest; and
    program code that stores structured interest information for the user, including a unique record for the inputted interest that includes the affinity score and dynamically generated tag.

9. The program product of claim 8, wherein each gesture in the set of gestures defined by the user includes a first indicator of relevance to the user.

10. The program product of claim 9, wherein previously collected behavior data is stored in a user interest database.

11. The program product of claim 10, wherein recognized behavior patterns are correlated by a learning system with a second indicator of relevance to the user.

12. The program product of claim 11, further comprising program code that utilizes the first indicator of relevance and the second indicator of relevance to calculate the affinity score.

13. The program product of claim 8, code wherein natural language input is used to form the dynamically generated tag.

14. The program product of claim 8, wherein the dynamically generated tag and affinity score are periodically reevaluated and updated in response to a received additional inputted context associated with the inputted interest.

* * * * *